No. 681,576. Patented Aug. 27, 1901.
A. S. PARSONS.
MOTOR CARRIAGE.
(Application filed July 7, 1899. Renewed Apr. 25, 1901.)
(No Model.) 3 Sheets—Sheet 1.

WITNESSES
INVENTOR
A. S. Parsons
BY
ATTORNEYS.

No. 681,576. Patented Aug. 27, 1901.
A. S. PARSONS.
MOTOR CARRIAGE.
(Application filed July 7, 1899. Renewed Apr. 25, 1901.)
(No Model.) 3 Sheets—Sheet 2.

INVENTOR
A. S. Parsons.

WITNESSES:

ATTORNEYS.

No. 681,576. Patented Aug. 27, 1901.
A. S. PARSONS.
MOTOR CARRIAGE.
(Application filed July 7, 1899. Renewed Apr. 25, 1901.)
(No Model.) 3 Sheets—Sheet 3.

WITNESSES:
M. S. Blondel,
Perry B. Turpin.

INVENTOR
A. S. Parsons.
BY Munn & Co.
ATTORNEYS.

THE NORRIS PETERS CO., PHOTO-LITHO., WASHINGTON, D. C.

UNITED STATES PATENT OFFICE.

ALBERT S. PARSONS, OF BERKELEY, CALIFORNIA.

MOTOR-CARRIAGE.

SPECIFICATION forming part of Letters Patent No. 681,576, dated August 27, 1901.

Application filed July 7, 1899. Renewed April 25, 1901. Serial No. 57,516. (No model.)

*To all whom it may concern:*

Be it known that I, ALBERT S. PARSONS, residing at Berkeley, in the county of Alameda and State of California, have made certain new and useful Improvements in Motor-Carriages, of which the following is a specification.

My invention is an improvement in motor-carriages, and has for its objects, among others, to furnish improvements in constructions whereby the turning of one truck will properly operate the other, to provide improvements in the means for transmitting the driving power from one truck to the other, and in the construction of the truck with the engine thereon; and the invention consists in certain novel constructions and combinations of parts, as will be hereinafter described, and pointed out in the claims.

Figure 1:
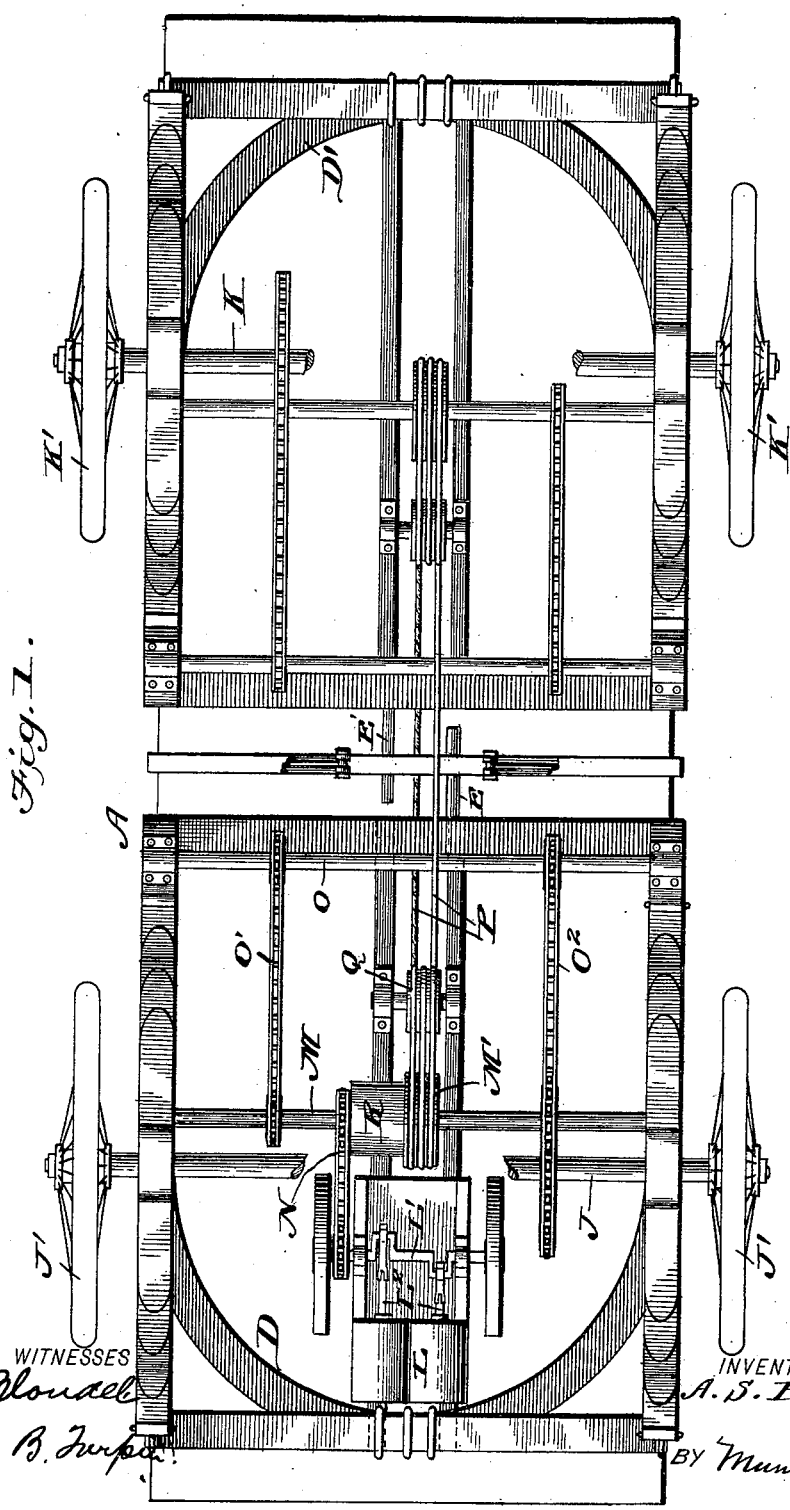
Figure 2:
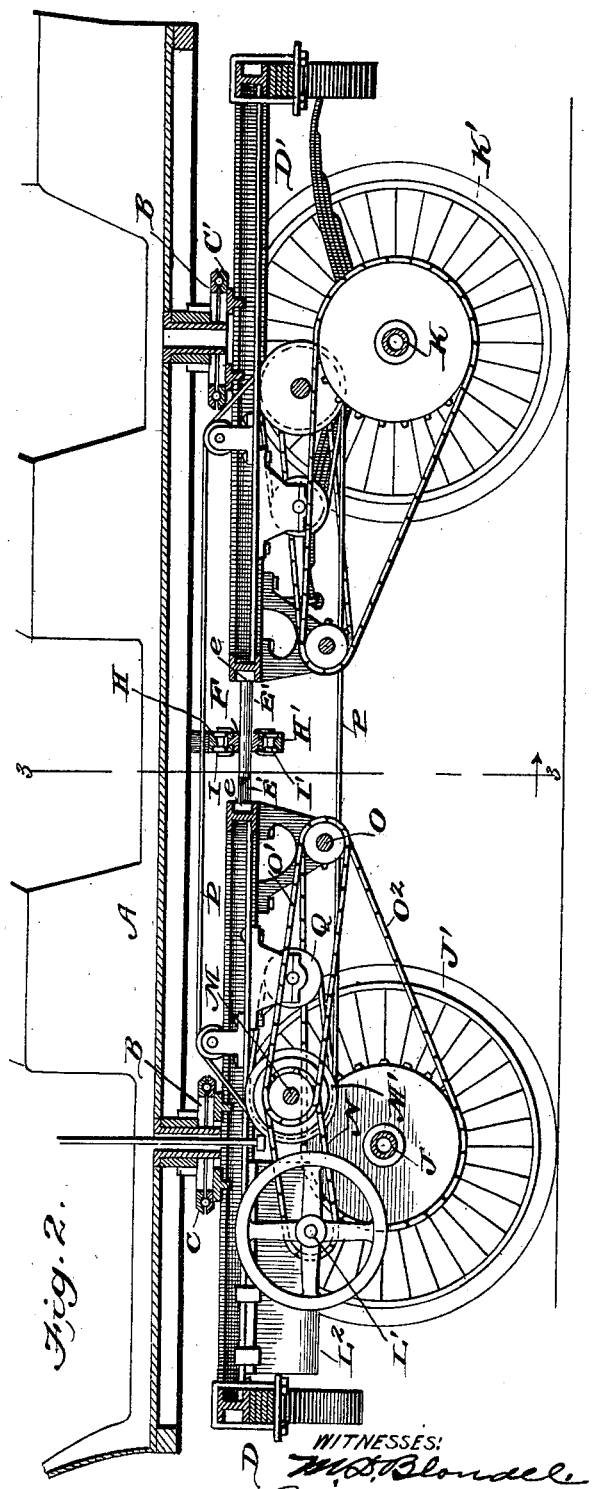
Figure 3:
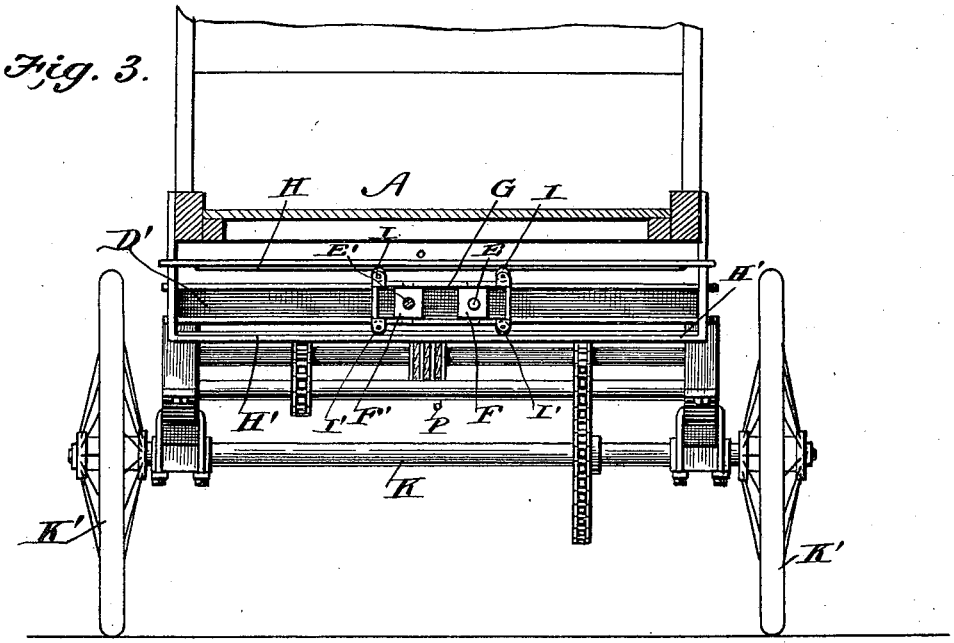
Figure 4:
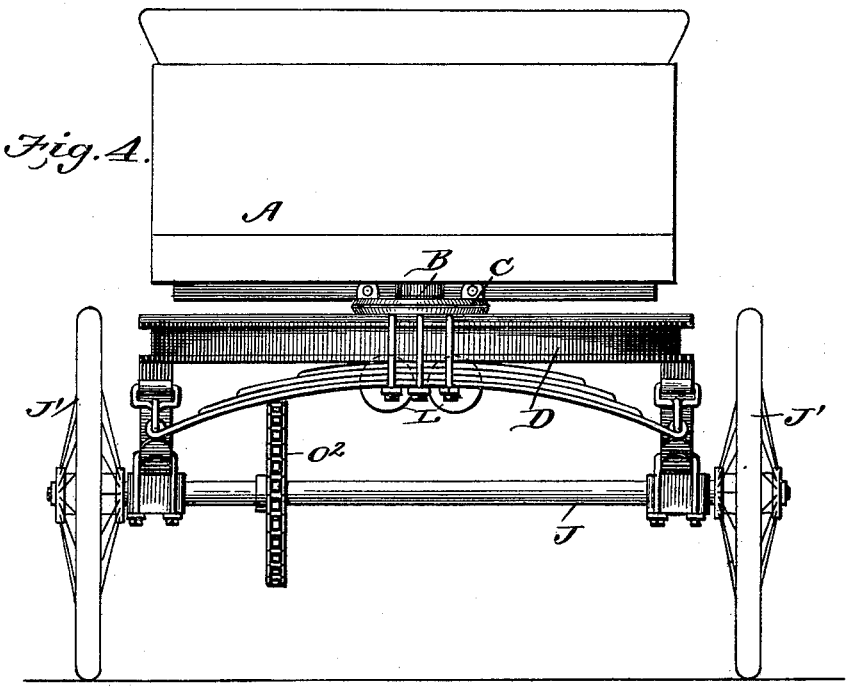

In the drawings, Figure 1 is a bottom plan view of my carriage. Fig. 2 is a vertical longitudinal section thereof. Fig. 3 is a cross-section on about the line 3 3 of Fig. 2, and Fig. 4 is an end elevation of the carriage. Fig. 5 is a detail perspective view of the truck-frame, and Fig. 6 is a detail view of the guide-carriage.

The framing and the body A may in general respects be of any desired construction, and to it are suitably secured the fifth-wheel frames B, on which the fifth-wheels C and C', attached to the front and rear trucks D D', turn, as will be understood from Fig. 2. By means of the fifth-wheel construction the trucks are pivoted so they can turn freely below the body A, and means are provided whereby the turning of one truck will properly operate the other. To this end the trucks are provided at their adjacent sides with projecting pins or studs E E', which fit in boxes F F'. These boxes F F' are pivoted vertically in a guide-carriage G, which is movable laterally below the carriage-framing between the two trucks and is preferably held and movable in a guideway having upper and lower rails H and H', which are engaged by rollers I and I' on the guide-carriage G. From the foregoing it will be seen that as one truck is turned it will operate to turn the other, so the rear truck will properly track the forward one in rounding curves.

It is preferred to make the truck-beams, as best shown in Figs. 2 and 5, of I-beams, which provide channels in which the head-plates *e* of the pins or studs may be seated and bolted, as will be understood from Figs. 2 and 5.

The truck-frames support the axles J and K, having the wheels J' and K', and these axles, with their attached wheels, are driven in the manner presently described.

The trucks are alike, except that I show the truck-frame D as supporting the engine L and the counter-shaft L' driven by the piston-rods $L^2$ of the engine L. The engine L is shown as of the gasolene type, and any suitable gasolene-engine may be employed or other forms of engine may be provided without departing from the broad principles of my invention. The engine-shaft L' drives the shaft M of the drive-pulley M' by means of the sprocket-chain N, and the shaft M drives a counter-shaft O by means of a sprocket-chain O', and the shaft O drives the axle J by means of the sprocket-chain $O^2$. The drive-pulley M' is fixed on the shaft M and has a series of grooves for the cable P, which is passed around said drive-pulley and also around a small traction-pulley Q, located between the drive-pulley and the inner end of the truck-frame. The drive-pulley M' is arranged near the pivot of the truck, on which it is supported to avoid as far as possible any throwing of the drive-pulleys out of position by the turning of the trucks. The cable P is passed around the drive-pulley M' and the traction-pulley Q, and thence around corresponding guide and traction pulleys on the truck D' and operates to transmit the power applied to the shaft M by the engine L to the drive-pulley of the truck D'. It will be noticed the truck D' is identical in construction with the truck D, except that in the truck D' the engine L, shaft $L^2$, and sprocket-chain N are omitted and the drive-pulley shaft is driven by the cable, as before described.

By my invention it will be seen I drive the axles of both trucks and furnish means for guiding one truck by the other consisting of the pins E and E', as before described. As best shown in Fig. 1, the pins E and E' are located slightly to one side of the center of their respective truck-frames.

In Fig. 1 I show a drum R, which may contain the reversing-gear and may be of any desired construction.

Having thus described my invention, what I claim, and desire to secure by Letters Patent, is—

1. In a motor-carriage, the combination of the framing having a laterally-disposed guideway provided with upper and lower bars or rails, a guide-carriage movable in said guideway in engagement with said rails from side to side relatively to the frame and provided with the pivoted boxes having horizontal openings, the truck-frames pivotally connected with the framing on opposite sides of the guideway, and studs or pins projecting from the adjacent sides of the truck-frames and entering the openings in their respective pivoted boxes of the guide-carriage substantially as set forth.

2. In a motor-carriage the combination with the independently-pivoted truck-frames provided at their adjacent sides with projecting pins or studs arranged slightly to one side of their respective pivots, and a laterally-movable carriage between said truck-frames having, on opposite sides of its center, portions engaged by the projecting pins or studs of the truck-frames substantially as set forth.

3. In a motor-carriage the combination with the pivoted trucks spaced apart and having the pins or studs projecting from their adjacent sides, of the guideway arranged between said truck-frames and having upper and lower bars or rails, and the carriage fitting said guideway and having rollers engaging the upper and lower rails thereof, and provided with the pivoted boxes having transverse openings receiving the pins or studs of the truck-frames substantially as set forth.

4. In a motor-carriage, the combination of the front and rear trucks having their frames formed of channel metal, the guide-carriage movable laterally between said truck-frames, and the pins or studs engaging said guide-carriage and having their base-plates seated and secured in the channels of the truck-frames substantially as set forth.

5. In a motor-carriage the combination with the front and rear trucks and their wheels, of guide-pulleys and drive-pulleys supported by said trucks, and a cable disposed on said guide and drive pulleys whereby the applied force may be transmitted to drive the wheels of both the trucks substantially as set forth.

6. In a motor-carriage the combination of the front and rear trucks, the cable for transmitting the motion between said trucks, and pulleys supporting said cable substantially as set forth.

7. In a motor-carriage the combination of the front and rear trucks independently pivoted, the drive-pulleys supported on their respective truck-frames near to the pivotal axes thereof, the traction-pulleys or idlers in line with their corresponding drive-pulleys and the cable disposed around said pulleys substantially as set forth.

8. In a motor-carriage the combination of the front and rear trucks, the cable drive-pulleys on their respective trucks the traction-pulleys or idlers, and the cable disposed around said drive-pulleys and idlers substantially as set forth.

ALBERT S. PARSONS.

Witnesses:
J. B. STEWART,
A. V. PERKINSON.